(12) United States Patent
Krueger et al.

(10) Patent No.: US 11,402,211 B2
(45) Date of Patent: Aug. 2, 2022

(54) SYSTEMS AND METHODS FOR ENHANCED OPTICAL POWER CONTROL

(71) Applicant: Honeywell International Inc., Charlotte, NC (US)

(72) Inventors: Neil A. Krueger, Saint Paul, MN (US); Glen A. Sanders, Scottsdale, AZ (US); Lee K. Strandjord, Tonka Bay, MN (US); Marc Smiciklas, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/077,192

(22) Filed: Oct. 22, 2020

(65) Prior Publication Data

US 2022/0128362 A1    Apr. 28, 2022

(51) Int. Cl.
  *G01C 19/72*    (2006.01)
  *G01C 19/66*    (2006.01)
  *G01C 19/64*    (2006.01)

(52) U.S. Cl.
  CPC .......... *G01C 19/727* (2013.01); *G01C 19/64* (2013.01); *G01C 19/661* (2013.01); *G01C 19/72* (2013.01); *G01C 19/721* (2013.01); *G01C 19/722* (2013.01)

(58) Field of Classification Search
  CPC .... G01C 19/727; G01C 19/64; G01C 19/661; G01C 19/72; G01C 19/721; G01C 19/722
  See application file for complete search history.

(56) References Cited

U.S. PATENT DOCUMENTS

| | | |
|---|---|---|
| 4,673,293 A | 6/1987 | Sanders |
| 7,522,284 B2 | 4/2009 | Sanders et al. |
| 7,844,152 B2 | 11/2010 | Sanders |
| (Continued) | | |

FOREIGN PATENT DOCUMENTS

| | | |
|---|---|---|
| CN | 103712615 A | 4/2014 |
| CN | 107869997 A | 4/2018 |
| (Continued) | | |

OTHER PUBLICATIONS

European Patent Office, "Extended European Search Report from EP Application No. 21190000.6", from Foreign Counterpart to U.S. Appl. No. 17/077,192, filed Jan. 31, 2022, pp. 1 through 9, Published: EP.

*Primary Examiner* — Jonathan M Hansen
(74) *Attorney, Agent, or Firm* — Fogg & Powers LLC (57) ABSTRACT

Improvements to optical power regulation in a gyroscopic system are described. The system can include an optical assembly (e.g., optical bench) which couples opposing optical signals to a resonator coil. The system can monitor the power of the optical signals through the resonator coil by including signal extraction optics in the optical assembly which are configured to extract a portion of the optical signals. The portions can be extracted via a single beamsplitter, wherein the beamsplitter reflects the portions at a single common surface, and can also reflect the portions to a respective photodetector in free space free from intervening optical components, such as polarizers or beamsplitters. One or more processors can be coupled to the optical assembly, wherein the processor(s) are configured to adjust the power of the optical signals in response to detecting a power difference between the optical signals.

20 Claims, 4 Drawing Sheets

(56) References Cited

U.S. PATENT DOCUMENTS

| | | | |
|---|---|---|---|
| 7,933,020 B1 | 4/2011 | Strandjord et al. | |
| 8,068,233 B2 | 11/2011 | Qiu et al. | |
| 8,098,380 B2 * | 1/2012 | Sanders | G01C 19/727 |
| | | | 356/461 |
| 10,197,397 B2 | 2/2019 | Sanders et al. | |
| 10,365,107 B2 * | 7/2019 | Sanders | G01C 19/722 |
| 10,429,187 B1 | 10/2019 | Sanders et al. | |
| 2010/0225923 A1 | 9/2010 | Strandjord et al. | |
| 2010/0290057 A1 | 11/2010 | Qiu et al. | |
| 2015/0260520 A1 | 9/2015 | Qiu et al. | |
| 2019/0212148 A1 * | 7/2019 | Sanders | G01C 19/727 |
| 2020/0072609 A1 | 3/2020 | Krueger et al. | |

FOREIGN PATENT DOCUMENTS

| | | |
|---|---|---|
| EP | 0749564 B1 | 7/1999 |
| EP | 1795865 B1 | 7/2016 |

* cited by examiner

SYSTEMS AND METHODS FOR ENHANCED OPTICAL POWER CONTROL

U.S. GOVERNMENT LICENSE RIGHTS

This invention was made with Government support under Government Contract NTA-CR-DOTC2016316-02, under program LC-TERM. The Government has certain rights in the invention.

BACKGROUND

Gyroscopes, both mechanical and optical, have long been an instrumental tool in vehicle (e.g. aircraft) navigation. At a basic level, optical gyroscopes operate by measuring the interference caused by two counterpropagating electromagnetic waves, which can be used to determine the rotation rate of an object coupled to the gyroscope via a phenomenon known as the Sagnac effect. The rotation rate, among other inertial calculations, can be helpful in determining the position of the aircraft at a given time.

Although many variations of optical gyroscopes exist today, the resonator fiber optic gyroscope (RFOG) has shown promise in providing a low-cost yet effective solution for rotation-based inertial systems. An RFOG measures rotation rate by coupling light beams via fiber optic mediums to guide the beams along counterpropagating paths through a fiber optic resonator coil loop. In addition, the power output of the two propagating light paths may also be measured.

However, a common weakness among gyroscopes (in particular RFOGs) is their susceptibility to bias instability; that is, differences in output from the counterpropagating light paths that is attributable to sources other than the actual rotation of the gyroscope. Bias instability may accrue through design imperfections in the gyroscope, but may also manifest through subtle power loss as the light beam passes through optical components, for example, filters, polarizers, lenses, and beamsplitters. For example, bias errors may result from power disparities between the counterpropagating light beams through the resonator coil. One such disparity is exhibited via the Kerr effect, which correlates the index of refraction of a material as dependent on the optical power. Thus, even minute differences in optical power between the two propagating light beams can result in measurable bias error. Accumulation of bias errors can translate to false or inaccurate rotation rate measurements, which can ultimately lead to a poor functioning gyroscope.

Existing technologies attempt to mitigate the effects of bias instability through optical power control of the light passing through the resonator coil. However, existing means for optical power control introduce additional sources of bias instability via the collection optics that are used to measure the output power exiting the resonator coil.

Therefore, there is a need for improved means to reduce the bias error from two propagating light beams in an optical gyroscope.

SUMMARY

Improvements in optical power regulation in a gyroscope are described. Non-limiting embodiments are briefly described in this Summary as indicated below.

In one embodiment, a system is provided. The system comprises a first optical signal source, wherein the first optical signal source is configured to transmit a first optical signal, and a second optical signal source, wherein the second optical signal source is configured to transmit a second optical signal. The system further comprises an optical assembly coupled to the first and second optical signal sources, wherein the optical assembly is configured to receive the first optical signal at a first input of the optical assembly. The optical assembly is configured to receive the second optical signal at a second input of the optical assembly. The optical assembly further comprises signal extraction optics positioned in free space, wherein the optical assembly comprises a first and second resonator loop closure optics. The system further comprises a resonator coil coupled to the optical assembly, wherein the resonator coil is configured to receive the first optical signal from the second resonator loop closure optics. The resonator coil is configured to receive the second optical signal from the first resonator loop closure optics. The signal extraction optics comprises a beamsplitter, wherein the beamsplitter is optically coupled to the first and second inputs. The beamsplitter is configured to receive the first and second optical signals. A first and second photodetector are optically coupled to the beamsplitter, wherein the first photodetector is configured to detect the portion of the first optical signal and the second photodetector is configured to detect the portion of the second optical signal. The beamsplitter is configured to reflect the portions of the first and second optical signals, wherein the portion of the first signal and the portion of the second optical signal is reflected from the beamsplitter to a respective one of the first and second photodetectors free from intervening optical components. One or more processors are coupled to the first and second photodetectors, wherein the one or more processors are configured to determine a first power value corresponding to the first optical signal from the first photodetector, a second power value corresponding to the second optical signal from the second photodetector, and adjust at least one of: the first power value and the second power value in response to a difference in power.

In another embodiment, an optical assembly positioned in a gyroscope is provided. The optical assembly comprises a first input, wherein the first input is configured to receive a first optical signal; and a second input, wherein the second input is configured to receive a second optical signal. The optical assembly further comprises signal extraction optics, wherein the signal extraction optics are configured to extract a portion of the first and second optical signals in free space. The signal extraction optics comprises a beamsplitter, wherein the beamsplitter is optically coupled to the first and second inputs. The beamsplitter is configured to receive the first and second optical signals and reflect a portion of the first and second optical signals. The optical assembly is coupled to a first and second photodetector, wherein the first photodetector is configured to detect the portion of the first optical signal and the second photodetector is configured to detect the portion of the second optical signal. The beamsplitter is configured to reflect the portions of the first and second optical signals, wherein the portion of the first optical signal and the portion of the second optical signal is reflected from the beamsplitter to a respective one of the first and second photodetectors free from intervening optical components.

In yet another embodiment, a method is provided. The method comprises inputting a first optical signal into a first portion of an optical assembly, wherein the optical assembly comprises signal extraction optics in free space. The method further comprises inputting a second optical signal into a second portion of the optical assembly. Additionally, the method further comprises receiving the first and second optical signals at the signal extraction optics. The method comprises reflecting a portion of the first and second optical signals, wherein the portion of the first optical signal and the portion of the second optical signal are reflected out from the signal extraction optics in free space free from intervening optical components. The method further comprises detecting at least a portion of the first and second optical signals, and determining a first power value corresponding to the first optical signal and a second power value corresponding to the second optical signal from the detected portions of the first and second optical signals. The method further comprises adjusting at least one of: the first power value and the second power value in response to a difference in power.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The following disclosure relates generally, though not exclusively, to improvements in optical power regulation in a gyroscope. In particular, the disclosure describes techniques directed to an optical assembly configured to measure and control the power of optical signals traveling through an optical medium, for example, a resonator coil of a gyroscope. The optical assembly can extract and measure the power output with reduced intervening collection optics than existing systems that control the power of optical signals. This reduces exposure to optical power fluctuations, and therefore reduces the impact of bias instability that pervades existing optical gyroscopes. Optical signals extracted by the optical assembly can be further isolated with reduced collection optics (e.g. polarizers) and without the use of structural/architectural components (e.g. couplers or waveguides), further reducing the risk of power fluctuation before the optical signals are detected. In additional embodiments, the assembly can be coupled to optical waveguides in a fashion that enables the optical waveguides to replace the functionality of components in the assembly that would otherwise be necessary in conventional systems that control power in optical signals.

Figure 1:
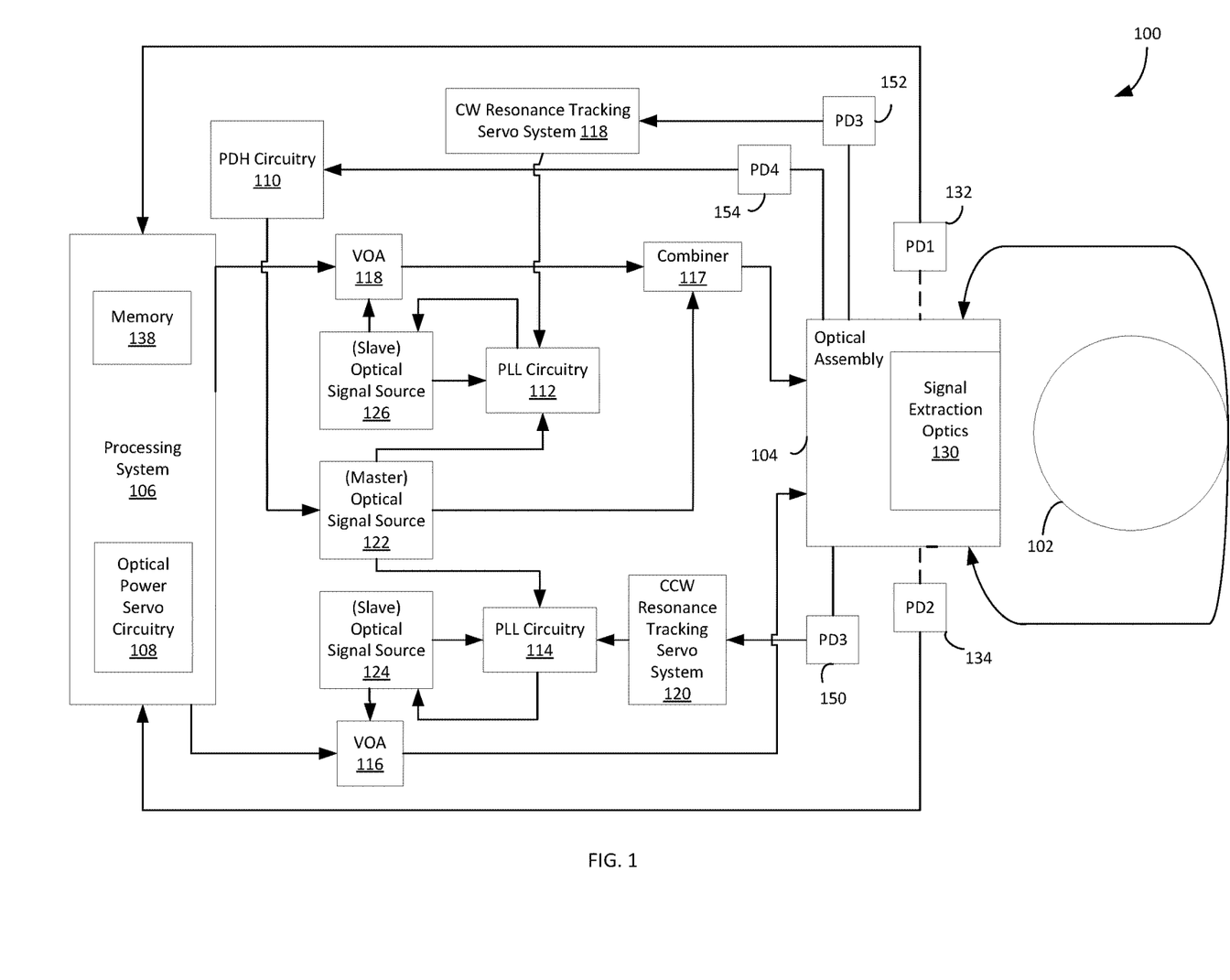
FIG. 1 depicts a block diagram of a gyroscopic system including an optical assembly, as described in one or more embodiments.

Referring to the drawings, FIG. 1 depicts an illustrative embodiment of a gyroscopic system (system) 100. System 100 includes optical assembly 104 configured to extract the power output of received optical signals. As used herein, optical assembly means an apparatus composed of a configuration of optical components placed on a fixed medium, such as an optical bench or optical breadboard. In exemplary embodiments, system 100 represents an RFOG; however, system 100 may include other types of gyroscopes, and the techniques described herein also apply to other gyroscopes or other such means of detecting rotation rates where applicable. Other gyroscopes which may be applicable to the present disclosure include (but are not limited to), interferometric fiber optic gyroscopes (IFOG) and ring laser gyroscopes (RLG). However, an RFOG is described to further illustrate the principles of the disclosure and provide pedagogical guidance and clarity. The individual components of system 100 may be coupled by various optical media, such as optical couplers, optical waveguides, or other media configured to guide optical signals to the intended destination.

In addition to optical assembly 104, system 100 also includes optical signal source 122, 124, and optical signal source 126. Optical signal source 122 is configured to transmit (e.g., generate) a first optical signal at a corresponding first frequency, while optical signal source 124 is configured to likewise transmit a second optical signal at a corresponding second frequency. Optical signal source 122 and 124 can be laser-emitting circuitry or assemblies, while the optical signal transmitted can be represented as a laser, light beam, or other electromagnetic wave that is sent through system 100. In exemplary embodiments, the optical signals generated by optical signal source 122 and 124 are separated by an offset frequency used to lock the phase of phase lock loop (PLL) circuitry 112. Also, optical signal source 122 and 124 may additionally produce optical signals at varying frequencies beyond the respective first and second frequencies; that is, the frequency of the optical signal produced by either optical signal source 122 or 124 may be adjusted, for example, through user input or in response to a changing servo electronics output.

The configuration of optical signal source 122 or 124 may be further configured as a master/slave configuration. In such configurations, the master source is configured to transmit a reference optical signal, and the slave source may be configured to transmit an optical signal based on the reference optical signal. For example, system 100 includes optical signal source 122 designated as the master source, while optical signal source 124 and optical signal source 126 are designated as slave sources. However, system 100 can be modified to include only two optical signal sources, in which the two sources can be prioritized as a master/slave configuration, or can be functionally equivalent (that is, no priority configuration). The master/slave architecture described above is more fully explored in U.S. Pat. No. 9,683,846 B2 (describing an exemplary illustration of this structure), and the structure relating to the master/slave architecture of U.S. Pat. No. 9,683,846 B2 as described in column 3 lines 24-64 is hereby incorporated by reference.

Optical gyroscopes operate by analyzing the optical path length difference between two counterpropagating optical signals along a closed path (e.g. those produced by signal sources 122 and 124), which can be translated into a rotational rate measurement via the relationship exhibited from the Sagnac effect. As will be described in further detail below, the optical signals transmitted from signal sources are input into a resonator coil in opposing directions. Hence, one signal is introduced and thus travels through the resonator coil in the clockwise (CW) direction, while the other signal travels through the coil in the counter-clockwise (CCW) direction. Depending on the precise embodiment, each signal source can be described based on the direction through which the corresponding optical signal travels through the resonator loop. For purposes of illustration, optical signal source(s) 122 and 126 may be referred to herein as "CW signal source" and the signal accordingly referred to as "CW signal" or "CW optical signal". Likewise, optical signal source 124 may be referred to herein as "CCW signal source" with a corresponding signal output as the "CCW signal" or "CCW optical signal". That said, one having skill in the art would have the requisite knowledge to modify or adapt system 100 such that the roles of signal sources 122 and 124 are reversed, both with respect to the master/slave priority designation and also the respective directional input into the resonator coil.

In the configuration shown in FIG. 1, master optical signal source 122 transmits a reference optical signal (e.g., via an optical medium) to both PLL circuitry 112 and 114 for the CW and CCW directions, respectively. The type of optical medium used to guide optical signals can vary, but in one embodiment, the optical medium can include an optical waveguide such as a fiber optic cable or an optical coupler. On the CW side, PLL circuitry 112 outputs a phase-locked optical signal to CW optical source 126 based on the reference optical signal and the optical signal transmitted by CW optical source 126. Likewise, PLL circuitry 114 outputs a phase-locked optical signal based on the reference optical signal and the optical signal transmitted by CCW optical source 124. The CW and CCW optical signals are transmitted to VOA 118 and 116, respectively. Each VOA is configured to adjust the respective power levels of the CW and CCW signals to a desired level for detection and optical power control.

If a three optical signal source system is used such as that depicted in FIG. 1, then system 100 may further include combiner 117, which is configured to receive the adjusted CW optical signal and the reference signal. Combiner 117 then outputs a combined signal to optical assembly 104. Likewise, the output of VOA 116 is used to adjust the power of the CCW input signal to the optical assembly 104. However, if only two optical signal sources are used, combiner 117 is eliminated, and optical signal source 122 does not propagate to optical assembly 104 and through fiber sensing coil 102. In that case, the CW optical signal can proceed like that illustrated with respect to CCW optical signal, where CCW optical signal source transmits a CCW optical signal directly to VOA 116, which then transmits an adjusted CCW optical signal to optical assembly 104.

Optical assembly 104 receives both the input CW and CCW optical signals from their designated inputs and guides the CW and CCW optical signals through their respective paths in the resonator coil 102 using various collection optics (e.g. lenses, beamsplitters, etc.), as described in further detail with reference to FIG. 3. In some embodiments, resonator coil 102 is a fiber optic medium that is wound up several times around to effectively form a closed loop and may be further situated via one or more optical media (e.g., fiber couplers). Optical assembly 104 also receives the CW and CCW optical signals through a third and fourth input as they travel through the opposing end of resonator coil 102. Using the received optical signals, optical assembly 104 is configured to extract the optical power of the signals within the resonator coil, via signal extraction optics 130 and as described in further detail in FIG. 2 below. Directly extracting the optical power of signals traveling through the resonator coil enables optical assembly 104 to directly monitor optical power levels within the gyroscope without the need for excess optical components that may cause additional aberrations in optical power between the CW and CCW signals. Furthermore, the reduced amount of components used to extract optical signals from the resonator coil enables even more precise optical power controls than existing systems and provides for a more simplified and cost-effective assembly.

The structure of optical assembly 104 or any described embodiments thereof can include any kind of optical assembly or apparatus for which optical components may be placed, applied, or coupled to. Optical assembly 104 can include a substrate material that acts as a foundation for which optical components may be placed, applied, or coupled to. Such optical components may include lenses (e.g., ball lenses, concave lenses, convex lenses, compound lenses, gradient refractive index (GRIN) lenses), optical splitters, combiners, polarizers, optical circulators, or other optics, although in other exemplary embodiments, the number of optical components should be reduced to prevent any unnecessary fluctuation in power when extracting optical signals in the resonator coil. Optical assembly 104 may optionally include an optical bench of suitable size for operation in system 100. In some embodiments, the optical bench can be constructed out of silicon or a silicon-based polymer, also referred to as a silicon optical bench.

As described above, optical assembly 104 can extract portions of the optical signals and send them for further processing to determine the optical power of the signal portions, and thus the power of the received signals. Such further processing may be realized through one or more processors or processing systems coupled to optical assembly 104, which receive the extracted signal portions and determine the power output as described above. To convert the optical signals into a processable electrical format, the extracted CW and CCW optical signals are transmitted to photodetectors 132 and 134, respectively, where they are converted into electrical signals based on the magnitude (power) of the extracted signal portion.

Processing system 106 is one example of a processing system configured to determine the optical power of the extracted CW and CCW optical signals. Processing system 106 may include any one or combination of processors, microprocessors, digital signal processors, application specific integrated circuits, field programmable gate arrays, and/or other similar variants thereof. Processing system 106 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures. Upon receiving the extracted CW and CCW signal portions, processing system 106 determines the power level corresponding to each signal portion. If processing system 106 detects a power difference between the two signals, it can then configure either VOA 116 or 118 (e.g., via optical power servo circuitry 108) to adjust the power output of the optical signal received from one of the optical signal sources in order to reduce the disparity in power and thereby reduce the extent of bias instability resulting from the Kerr effect.

Additionally, processing system 106 may include or be coupled to a memory circuit, such as memory 138. Memory 138 can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. The memory may also include one or more databases to store acquired data.

Optical assembly 104 can be configured to couple the optical signals to various other components of system 100. For example, optical assembly can transmit the CW and CCW optical signals to resonance tracking servo system 118 and 120, respectively, which are configured to lock the optical signals to their respective CW and CCW resonance frequencies as determined by optical signal sources 126 and 124. Additionally, optical assembly 104 can transmit the resonant optical signal (transmitted at the resonance frequency of the resonator coil 102) to pound-drever-hall (PDH) lock circuitry 110, which is configured to lock the optical signal of the master optical signal source 122 to the same frequency as the resonance frequency of the resonator coil 102. Each signal transmitted to resonance tracking servo systems 118, 120, and PDH circuitry 110 from optical assembly 104 can be converted to an electrical signal via photodetectors 152, 150, and 154, respectively.

Figure 2:
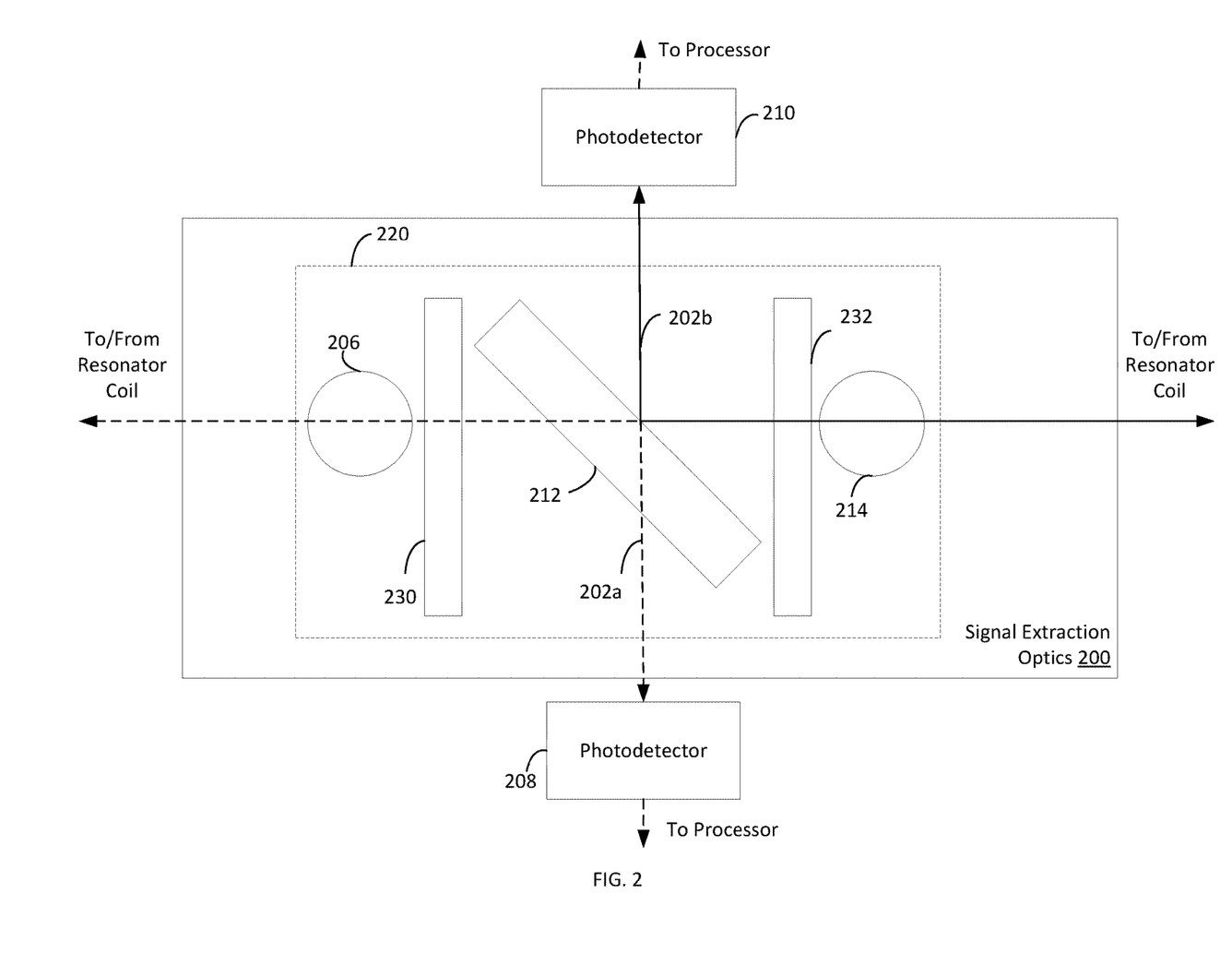
FIG. 2 depicts a block diagram of an optical assembly, as described in one or more embodiments.

FIG. 2 illustrates an exemplary embodiment of signal extraction optics configured for optical power control of signals in a resonator coil using reduced optical components, which may be included in the gyroscope depicted in FIG. 1. Signal extraction optics 200 includes a collection of optical components within signal extraction region 220. As the optical signals travel through the resonator coil in the CW and CCW directions, they will eventually approach signal extraction optics 200 on opposite sides. For example, one optical signal will enter signal extraction optics on the left side, while the opposite optical signal will enter signal extraction optics on the right side.

Signal extraction optics 200 can be included within an optical assembly, such as optical assembly 104 described in FIG. 1. Where the optical assembly is utilized in an RFOG, signal extraction optics 200 may be coupled to additional coupling optics or waveguides that couple signal extraction optics 200 to the resonator coil, for example resonator loop closure optics 312/314, as shown in the architectures in FIGS. 3. For pedagogical reasons, the CW optical signal is described as entering signal extraction optics 200 from the left side while the CCW optical signal enters the right side.

The CW optical signal enters signal extraction optics 200 from the left side and enters signal extraction region 220. Signal extraction region 220 is a region of free space within signal extraction optics 200 for which at least a portion of the optical signals passing through the region can be extracted and detected. Free space as used herein means a region of open environment such that optical signals passing through the region do so uninterrupted by waveguides, such as fiber couplers or fiber optic cables. For example, a free space region, such as signal extraction region 220, can be a gaseous medium (e.g., air) such that the index of refraction is substantially one. Optical signals passing through signal extraction region 220 do so uninterrupted by waveguides, such as fiber couplers or fiber optic cables. In some embodiments, signal extraction region can be a vacuum region or medium composed of inert gaseous particles such that optical signals are not reflected or otherwise impacted by the surrounding medium as they travel. However, signal extraction region 220 may include various optical components. For example, signal extraction region 220 may include lenses, polarizers, and one or more beamsplitters. In other exemplary embodiments, only one beamsplitter is used; however, a second beamsplitter may be used where one beamsplitter splits CW optical signal 202a and another splits CCW optical signal 202b.

In the embodiment shown in FIG. 2, the CW optical signal enters extraction region 220 and passes through lens 206. Lens 206 is illustrated as a ball lens in FIG. 2; however, any type of lens may be used. Polarizer 230 is optically coupled to lens 206 in signal extraction region 220, where it receives the CW optical signal. Polarizer 230 ensures that the CW optical signal is in the desired polarization state, e.g. horizontal, vertical, S, or P polarization. The CW optical signal then contacts with beamsplitter 212, where a portion of the signal is reflected from beamsplitter 212 and directed towards photodetector 208.

As shown in FIG. 2, the reflected portion of optical signal 202a from beamsplitter 212 travels directly through signal extraction region 220 to photodetector 208. That is, the reflected portion travels to photodetector 208 free from intervening optical components, such as lenses, polarizers, circulators, splitters, waveguides, or any other components that may receive the optical signal. Alternatively stated, the reflected portion does not pass through additional optical components after being reflected by beamsplitter 212 before it is detected by photodetector 208. This configuration not only simplifies the architecture of signal extraction optics 200 (and by extension the optical assembly), which may lead to a more cost-effective means of optical power control, but also reduces the impact of potential power fluctuations that may contribute to bias instability before the signal is detected.

In some embodiments, signal extraction region 220 includes only one beamsplitter (e.g., beamsplitter 212) that extracts portions of the CW (and CCW) optical signal from the total signal. Beamsplitter 212 may be placed in signal extraction region 220 such that it acts as a central extraction agent that can reflect both optical signals out of signal extraction region 220 without the use of additional beamsplitters or other collection optics to guide the reflected portions before detection.

Since the reduction of optical components (and in some embodiments, simplified architecture) preserves the power output of the signals through the resonator coil, the extracted portion need only comprise a very small percentage of the total power output of the optical signals. In some embodiments, the extracted portion is only a few percentage points of the total signal power, such as 3% or less. In additional embodiments, the extracted portion is even less at 0.5-1% inclusive of the total signal power. However, the amount of the extracted signal portion will vary as needed for adequate system functionality and photodetector detection quality. In some embodiments, optical components with negligible polarization-dependent loss, such as a lens, may be placed in between the optical path between beamsplitter 212 and photodetectors 208/210.

The extracted portion exits signal extraction region 220 and is detected by photodetector 208, which is configured to transform the received optical signal into a corresponding electrical signal. Using the electrical signals, the power of the CW optical signal in the resonator can be determined. For example, photodetector 208 (and by extension photodetector 210) can be coupled to one or more processing systems, e.g., processing system 106, configured to determine the power output of the CW/CCW optical signals. The remaining portions of the optical signals that are not extracted, which in some embodiments may be a substantial percentage of the signal power, pass through beamsplitter 212 where they additionally pass through polarizer 232, lens 214, and exit signal extraction region 220. From there, the CW optical signal exits the optical assembly where it may continue to travel through resonator coil 102 or guided out of the resonator signal path via collection optics and/or optical media. In some embodiments, such as those described with respect to FIG. 3, the CW optical signal can be transmitted through resonator loop closure optics 312 and coupling optics 334 to a resonance tracking servo system (e.g., CW resonance tracking servo system 118).

In similar fashion to the CW optical signal, the CCW optical signal enters signal extraction optics 200 from the right side where it then enters signal extraction region 220. After passing through lens 214, a portion of the CCW optical signal reflects off beamsplitter 212 to CCW photodetector 210. Ideally, the portion extracted from the CCW optical signal will be equal to the portion extracted from the CW optical signal. Photodetector 210 receives the extracted signal and transforms it into an electrical signal, where it can be further processed to determine the power output of the optical signal in the resonator coil. The remaining portions not reflected from beamsplitter 212 pass through to lens 206, where it exits signal extraction region 220. Likewise, the CCW optical signal may travel back through the resonator coil or transmitted out of the optical assembly through resonator loop closure optics 314 and coupling optics 332.

Fewer optical components can be present both in the optical assembly and in particular signal extraction optics 200 than existing systems. As shown in FIG. 2, the reflected portions of the optical signals do not pass through any optical polarizers before detection by photodetectors 208 and 210. Optical components, but in particular polarizers, can alter the power of the optical signals that pass through. These minute power changes can accumulate as the signal passes through additional components. However, a problem with existing optical assemblies is that such assemblies typically require a combination of multiple beamsplitters, polarizers, waveguides and other optical components to control power in or near the resonator coil. The added collection optics thus make it difficult to finely tune the power output so that the power is equivalent between the CW and CCW paths in the resonator coil. Even then, adding unnecessary components increases the risk that power output will fluctuate between the two paths, which can translate to an erroneous rotation rate measurement in the gyroscope.

Yet the configuration of signal extraction optics 200 can reduce the effects of power instability in the resonator coil by simplifying the optical configuration necessary to extract power. Unlike existing systems, signal extraction optics 200 can include only one beamsplitter in extraction region 220. Furthermore, signal extraction optics 200 includes fewer polarizing components than existing systems and may extract optical signals without the aid of polarizers. In particular, no polarizer is needed to extract power from either the CW and CCW optical signals (e.g. by inserting a polarizer in between beamsplitter 212 and photodetectors 208 and 210), nor are any additional beamsplitters needed to guide the extracted optical signals to photodetectors 208 and 210. The reduction of components from existing systems thus reduces the likelihood of power instability in the resonator coil while providing a simplified optical assembly configuration. And as FIG. 2 illustrates, both the CW/CCW optical signals can be reflected from the same surface of beamsplitter 212, thereby further reducing the variation in power between the two signals during signal extraction (including variation from environmental sources).

Figure 3:
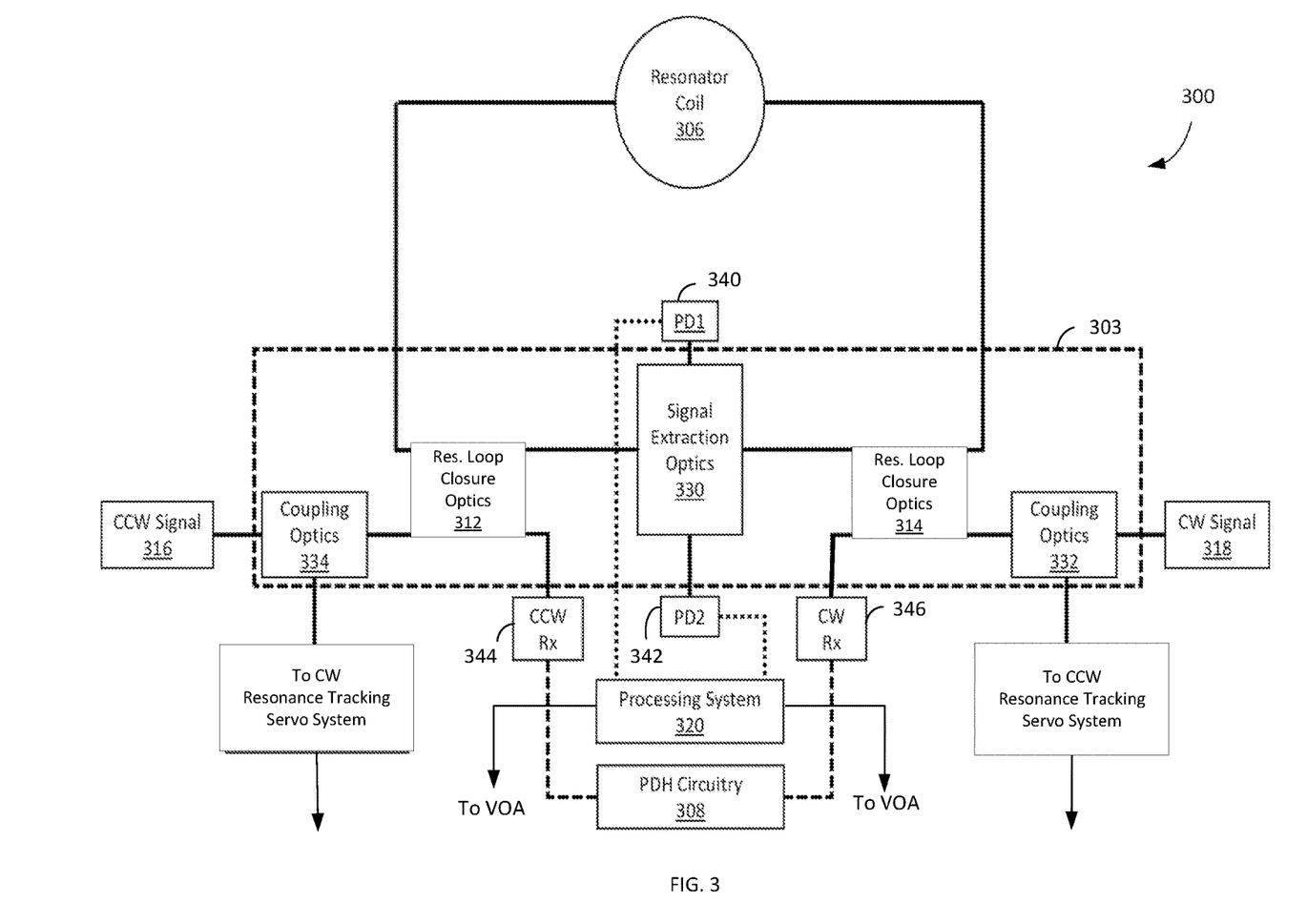
FIG. 3 depicts a diagram of an alternative gyroscopic system including an optical assembly, as described in one or more embodiments.

FIG. 3 illustrates a diagram of another embodiment of a gyroscopic system including an optical assembly. System 300 can be structured as a cost-effective alternative means for implementing a gyroscope, such as the gyroscope of system 100. Specifically, system 300 can implement the functions of system 100 using reduced optical components and modified configuration of optical media, which can be implemented as fiber couplers as a cost-effective technique to complement the simplified architecture of system 300. System 300 includes an optical assembly 303 coupled to a processing system 320 and resonator coil 306.

Optical assembly 303 can include any of the assemblies described, including optical assembly 104 depicted in FIG. 1. In addition to signal extraction optics 330, optical assembly 303 also includes resonator loop closure optics 312 and 314, and coupling optics 332 and 334 which couple the optical signals that pass through resonator coil 306 to other parts of system 300, for example, to a CW or CCW resonance tracking system.

Using a CCW optical signal path for pedagogical description, CCW optical signal 316 (generated via an optical signal source) enters optical assembly 303 from the left side and coupling optics 334 therein. Coupling optics may include any type of coupling materials or optical components to guide optical signals to appropriate components in system 300. In various embodiments, the coupling optics can include one or more optical circulators or beamsplitters. Alternatively, the coupling optics can include waveguides such as fiber couplers.

The CCW optical signal passes through coupling optics 334 and enters resonator loop closure optics 312. Resonator loop closure optics 312 include optical components and/or coupling materials configured to transfer optical signals to/from the resonator loop path, and may include similar or identical components as coupling optics 334. At least a portion of the CCW optical signal enters signal extraction optics 330 (e.g., from the left side). The CCW optical signal then passes through resonator loop closure optics 314 and circulates through resonator coil 306 in the CCW direction. System 300 may include PDH circuitry 308 and optionally designate the CCW signal source as the "master" signal source. In such embodiments, PDH circuitry 308 is coupled to resonator loop closure optics 312 through a CCW receiver port 344. CCW receiver port 344 includes a photodetector, which translates the CCW optical signal to a corresponding electrical signal. A portion of the CCW electrical signal can then also enter PDH circuitry 308, in which case PDH circuitry 308 locks the resonance frequency of the CCW optical signal to the frequency of the resonator coil. Although not depicted in FIG. 3, PDH circuitry may be configured to transmit the locked signal back to the master CCW optical source (for example, as shown in FIG. 1).

As described above, the CCW optical signal enters signal extraction optics 330, where a portion of the signal is extracted to one of photodetectors 340 or 342. The portions not extracted exit signal extraction optics 330, where some portions re-enter resonator coil 306 while others exit the resonator loop via resonator loop closure optics 314. From there, the exiting portions pass through coupling optics 332 and exit optical assembly 303 where they can be transmitted to a CCW resonance tracking servo system.

Processing system 320 receives the extracted portion of the CCW optical signal (and that of the corresponding CW optical signal) from signal extraction optics 330 via photodetectors 340 and 342. Processing system 320 then determines the power levels of the extracted optical signals and the power difference (if any) as described above. Once a power difference is determined, processing system 320 can adjust the power levels of the CCW optical signal and/or the CW optical signal in optical assembly 303. This can be achieved via one or more VOAs coupled to processing system 320 (not shown in FIG. 3). For example, processing system 320 can configure the VOAs (e.g., by a command signal) to attenuate the power of either CCW and/or CW optical signals based on the determined power difference.

In the opposing direction, the CW optical signal 318 enters optical assembly 303 through coupling optics 332 and subsequently resonator loop closure optics 314. From there, at least one portion of the CW optical signal enters signal extraction optics 330 (e.g., from the right side), passes through resonator loop closure optics 312, and circulates through resonator loop 306 in the CW direction until entering resonator loop closure optics 314 and signal extraction optics 330 from the side opposite to the CCW optical signal. If the CW optical signal source is designated as the "master" source, as in some embodiments, then a portion of the CW optical signal enters CW receiver port 346, wherein the optical signal is transformed to an electrical signal. Then, the signal is sent to PDH circuitry 308, which locks the resonant frequency as described above. Since only one signal source is designated "master", PDH circuitry 308 should only be coupled to one of resonator loop closure optics 312 and 314 depending on the designated master signal source. For example, if the CW optical signal source (laser) is designated as the master source, then PDH circuitry 308 should only receive a signal from CW receiver port 346.

The CW optical signal enters signal extraction optics 330 which, similar to the CCW optical signal described above, can be extracted to one of photodetectors 340 and 342 and sent to processing system 320 to determine the power level corresponding to the CW optical signal. Processing system 320 can be further configured to adjust the power of the CW optical signal if there is a disparity between the power of the CW and the CCW optical signals such that the power between the two signals is approximately equal. The portions of the CW optical signal that are not extracted exit signal extraction optics 330 and enter resonator loop closure optics 312. From there, the CW optical signal may either pass through resonator 306 and re-enter optical assembly 303 or may exit optical assembly 303 via coupling optics 334 to a CW resonance tracking servo system. In some embodiments, one or more of coupling optics 334/332 and resonator loop closure optics 312/314 comprise free-space optical components.

Similar to signal extraction optics 200 described above, signal extraction optics 330 can transmit the extracted CW and CCW optical signals without the use of polarizers and can also include a signal extraction region in free space that passes the signals with fewer optical components than existing systems. In some embodiments, the signal extraction region includes only one beamsplitter that reflects both the CCW and CW optical signals for optical power detection.

Figure 4:
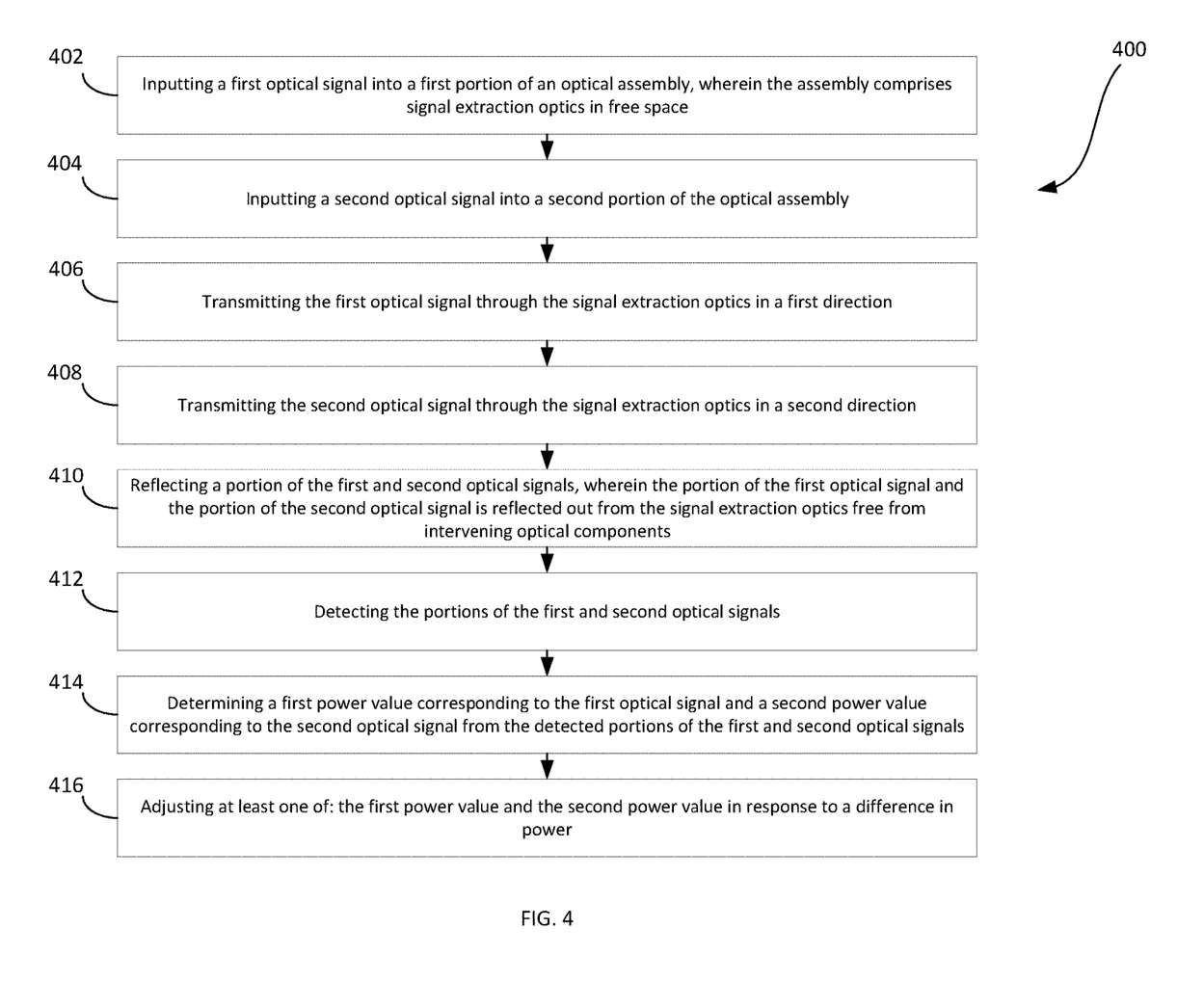
FIG. 4 depicts a flow chart of a method for controlling the power output of two propagating light beams, as described in one or more embodiments.

FIG. 4 illustrates a method for controlling the power output of two optical signals. Method 400 may be implemented via the techniques described with respect to FIGS. 1-3, but may be implemented via other techniques as well. For example, method 400 can apply to the operation of an optical assembly that can be implemented in an RFOG, but the techniques disclosed with respect to method 400 may apply to other systems or devices where applicable. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 400 begins at block 402 by inputting a first optical signal into a first portion of an optical assembly, wherein the optical assembly comprises signal extraction optics in free space. The optical assembly can include any of the assemblies described above, such as optical assembly 104 and/or 303. The first optical signal can be input into the optical assembly from the resonator coil of an RFOG, but the first optical signal can also be input into the optical assembly from other sources in which power control and/or monitoring of the optical signals is desired. Signal extraction optics are the optical components used to extract optical signals for power detection and further analysis. Then, a second optical signal is input into a second portion of the optical assembly (e.g. the opposite end of the optical assembly) in block 404.

Method 400 then proceeds to block 406, where the first optical signal is transmitted through the signal extraction optics in a first direction. Since optical components and in particular polarizers contribute non-trivial amounts of polarization-dependent loss to the power of optical signals, the optical signal should pass through the signal extraction optics with minimal polarizing optical components. In doing so, the effects of the Kerr effect can be reduced, and hence improve the bias stability of the system.

Proceeding to block 408, the second optical is transmitted through the signal extraction optics in a second direction. In an embodiment, the first optical signal is transmitted through a resonator coil in a CW direction while the second optical signal is transmitted through the resonator coil in a CCW direction before both signals enter the optical assembly through opposing ends of the assembly.

Next, at block 410, a portion of the first and second optical signals is reflected, wherein the portion of the first optical signal and the portion of the second optical signal is reflected through the signal extraction optics free from intervening optical components. To put another way, once the signals are reflected, the reflected portions of first and second optical signals do not pass through any additional optical components while they travel out of the signal extraction region.

Optical components include lenses, polarizers, beamsplitters, circulators, waveguides, or any other components. Instead, the reflected portions travel uninterrupted through free space until they are detected. As described above, portions of first and second optical signals are extracted in order to determine the power output of the two signals in the resonator coil or another interested region. In some embodiments, the first and second optical signals are reflected by a single beamsplitter, which may reflect the signals in opposite directions out of the signal extraction region. Splitting the signals from the same source further reduces the power fluctuation from the two signals before extraction.

From there, method 400 proceeds to block 412 by detecting the portion of the first and second optical signals. In some embodiments, the portions can be detected by a first photodetector and a second photodetector that are positioned on opposite sides of the signal extraction region. One photodetector can be configured to detect the extracted portion of the first optical signal, while the other photodetector can be equivalently configured for the second optical signal.

Proceeding to block 414, method 400 determines a first power value corresponding to the first optical signal and a second power value corresponding to the second optical signal. The power value corresponds to the magnitude of the extracted portion of the optical signal that is received by the respective photodetectors. In some embodiments, the extracted signal portion is substantially less than the total power output (e.g., 3% or less) of the corresponding optical signal that is transmitted through the signal detection optics. In other embodiments, the extracted signal portion is 0.5-1% inclusive than the total power output.

Method 400 ends at block 416 by adjusting at least one of: the first power value and the second power value in response to a difference in power. Once the power values corresponding to the extracted portions of first and second optical signals have been determined, the total power output for each of the signals can be further derived. If the power value of the first optical signal is not equivalent to the power value of the second optical signal, then there will be a difference in power between the power output of the two optical signals. As described above, the power output difference can create bias instabilities which can reduce the accuracy of the rotation rate determination, for example, by introducing residual errors. Therefore, the power output of either the first optical signal or the second optical signal, or both, can be adjusted to mitigate the power disparity and hence improve the bias stability. Power adjustment can be made via the processing systems described with respect to FIGS. 1 and 3.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

EXAMPLE EMBODIMENTS

Example 1 includes a system, comprising: a first optical signal source, wherein the first optical signal source is configured to transmit a first optical signal; a second optical signal source, wherein the second optical signal source is configured to transmit a second optical signal; an optical assembly coupled to the first and second optical signal sources, wherein the optical assembly is configured to receive the first optical signal at a first input of the optical assembly, wherein the optical assembly is configured to receive the second optical signal at a second input of the optical assembly, wherein the optical assembly comprises signal extraction optics positioned in free space, wherein the optical assembly comprises a first and second resonator loop closure optics; a resonator coil coupled to the optical assembly, wherein the resonator coil is configured to receive the first optical signal from the second resonator loop closure optics, wherein the resonator coil is configured to receive the second optical signal from the first resonator loop closure optics; wherein the signal extraction optics comprises a beamsplitter, wherein the beamsplitter is optically coupled to the first and second inputs, wherein the beamsplitter is configured to receive the first and second optical signals, wherein a first and second photodetector is optically coupled to the beamsplitter, wherein the first photodetector is configured to detect a portion of the first optical signal and the second photodetector is configured to detect a portion of the second optical signal; wherein the beamsplitter is configured to reflect the portions of the first and second optical signals, wherein the portion of the first optical signal and the portion of the second optical signal is reflected from the beamsplitter to a respective one of the first and second photodetectors free from intervening optical components; and one or more processors coupled to the first and second photodetectors, wherein the one or more processors are configured to: determine a first power value corresponding to the first optical signal from the first photodetector and a second power value corresponding to the second optical signal from the second photodetector, and adjust at least one of: the first power value and the second power value in response to a difference in power.

Example 2 includes the system of Example 1, further comprising Pound-Drever-Hall circuitry coupled to the optical assembly and one of the first and second resonator loop closure optics, wherein the Pound-Drever-Hall circuitry is configured to receive a second portion of one of the first optical and the second optical signal, wherein the Pound-Drever-Hall circuitry is configured to lock a resonance frequency of the system based on which of the first or second optical signal sources is designated a master optical signal source.

Example 3 includes the system of any of Examples 1-2, further comprising one or more variable optical attenuators coupled to the one or more processors, wherein the one or more variable optical attenuators are configured to attenuate power of at least one of the first optical signal and the second optical signal based on a command signal received from the one or more processors.

Example 4 includes the system of any of Examples 1-3, wherein the optical assembly further comprises first and second coupling optics respectively coupled between the first and second resonator loop closure optics and respectively coupled to one of the first optical signal source and the second optical signal source, and wherein the first coupling optics is configured to: receive the first optical signal from the first optical signal source, receive a third portion of the second optical signal; transmit the first optical signal to the first resonator loop closure optics, and transmit the third portion of the second optical signal to a first resonance tracking servo system; and wherein the second coupling optics is configured to: receive the second optical signal from the second optical signal source, receive a third portion of the first optical signal, transmit the second optical signal to the second resonator loop closure optics; and transmit the third portion of the first optical signal to a second resonance tracking servo system.

Example 5 includes the system of Example 4, wherein at least one of the first resonator loop closure optics, second resonator loop closure optics, first coupling optics, and second coupling optics comprise one or more fiber couplers.

Example 6 includes the system of any of Examples 4-5, wherein at least one of the first resonator loop closure optics, second resonator loop closure optics, first coupling optics, and second coupling optics comprise free-space optical components.

Example 7 includes an optical assembly positioned in a gyroscope, comprising: a first input, wherein the first input is configured to receive a first optical signal; a second input, wherein the second input is configured to receive a second optical signal; and signal extraction optics, wherein the signal extraction optics are configured to extract a portion of the first and second optical signals in free space; wherein the signal extraction optics comprises a beamsplitter, wherein the beamsplitter is optically coupled to the first and second inputs, wherein the beamsplitter is configured to receive the first and second optical signals, wherein the optical assembly is coupled to a first and second photodetector, wherein the first photodetector is configured to detect a portion of the first optical signal and the second photodetector is configured to detect a portion of the second optical signal, and wherein the beamsplitter is configured to reflect the portions of the first and second optical signals, wherein the portion of the first optical signal and the portion of the second optical signal is reflected from the beamsplitter to a respective one of the first and second photodetectors free from intervening optical components.

Example 8 includes the optical assembly of Example 7, wherein the gyroscope is a resonator fiber optic gyroscope (RFOG).

Example 9 includes the optical assembly of any of Examples 7-8, wherein the optical assembly is coupled to one or more processors, wherein the one or more processors are configured to: determine a first power value corresponding to the first optical signal from the first photodetector and a second power value corresponding to the second optical signal from the second photodetector; and adjust at least one of: the first power value and the second power value in response to a difference in power.

Example 10 includes the optical assembly of any of Examples 7-9, wherein the signal extraction optics includes a first lens optically coupled to the beamsplitter, and a second lens optically coupled to the beamsplitter.

Example 11 includes the optical assembly of any of Examples 7-10, wherein the beamsplitter is configured to reflect both the first and second optical signals from a common surface point on the beamsplitter.

Example 12 includes the optical assembly of any of Examples 7-11, wherein the optical assembly further comprises first and second resonator loop closure optics, wherein the first resonator loop closure optics is coupled to the first input and the second resonator loop closure optics is coupled to the second input, wherein the first and second resonator loop closure optics comprise at least one of a fiber coupler, beamsplitter, and circulator, and wherein the first and second resonator loop closure optics are configured to couple the first and second optical signals to a resonator coil.

Example 13 includes the optical assembly of Example 12, wherein at least one of the first resonator loop closure optics and second resonator loop closure optics comprise free-space optical components.

Example 14 includes the optical assembly of any of Examples 7-13, wherein the optical assembly comprises a Silicon optical bench.

Example 15 includes a method, comprising: inputting a first optical signal into a first portion of an optical assembly in a first direction, wherein the optical assembly comprises signal extraction optics in free space; inputting a second optical signal into a second portion of the optical assembly in a second direction; receiving the first and second optical signals at the signal extraction optics; reflecting a portion of the received first and second optical signals, wherein the portion of the received first optical signal and the portion of the received second optical signal are reflected out from the signal extraction optics in free space free from intervening optical components; detecting the reflected portions of the first and second optical signals; determining a first power value corresponding to the first optical signal and a second power value corresponding to the second optical signal from the detected portions of the first and second optical signals; and adjusting at least one of: the first power value and the second power value in response to a difference in power.

Example 16 includes the method of Example 15, wherein the signal extraction optics comprises a beamsplitter, and wherein reflecting at least a portion of the received first and second optical signals further comprises reflecting at least a portion of both the received first and second optical signals via the beamsplitter from a common surface point on the beamsplitter.

Example 17 includes the method of any of Examples 15-16, wherein detecting the reflected portions of the first and second optical signals further comprises detecting the reflected portion of the first optical signal via a first photodetector and detecting the reflected portion of the second optical signal via a second photodetector, and wherein the portions of the first and second optical are reflected to a respective one of the first and second photodetector free from intervening optical components.

Example 18 includes the method of any of Examples 15-17, further comprising polarizing the first and second optical signals before reflecting at least a portion of the first and second optical signals.

Example 19 includes the method of any of Examples 15-18, wherein reflecting at least a portion of the received first and second optical signals comprises reflecting a respective received portion that has a power between Example 0.5-1% inclusive of a total power of the first and second optical signals, respectively.

Example 20 includes the method of any of Examples 15-19, further comprising transmitting the first and second optical signals through a first and second lens, respectively, before the portions of the first and second optical signals are reflected.

The terms "about" or "substantially" mean that the value or parameter specified may be somewhat altered, as long as the alteration does not result in nonconformance of the process or structure to the illustrated embodiment from the perspective of one having ordinary skill in the art. For instance, unless otherwise indicated, a numerical quantity modified by the term "substantially" can be altered to within ±20% of the specified value. Finally, the term "exemplary" merely indicates the accompanying description is used as an example, rather than implying an ideal, essential, or preferable feature of the invention.

From the foregoing, it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the circuit components described above may be disposed on a single or multiple integrated circuit (IC), one or more microprocessors, or one or more microcontrollers. In addition, one or more components of a described apparatus or system may have been omitted from the description for clarity or another reason. Furthermore, one or more components of a described apparatus or system that have been included in the description may be omitted from the apparatus or system. Unless otherwise described, the term "module" is intended to encompass circuitry for performing the described functions.

What is claimed is:

1. A system, comprising:
a first optical signal source, wherein the first optical signal source is configured to transmit a first optical signal;
a second optical signal source, wherein the second optical signal source is configured to transmit a second optical signal;
an optical assembly coupled to the first and second optical signal sources, wherein the optical assembly is configured to receive the first optical signal at a first input of the optical assembly, wherein the optical assembly is configured to receive the second optical signal at a second input of the optical assembly, wherein the optical assembly comprises signal extraction optics positioned in free space, wherein the optical assembly comprises a first and second resonator loop closure optics;
a resonator coil coupled to the optical assembly, wherein the resonator coil is configured to receive the first optical signal from the second resonator loop closure optics, wherein the resonator coil is configured to receive the second optical signal from the first resonator loop closure optics;
wherein the signal extraction optics comprises a beamsplitter, wherein the beamsplitter is optically coupled to the first and second inputs, wherein the beamsplitter is configured to receive the first and second optical signals,
wherein a first and second photodetector is optically coupled to the beamsplitter, wherein the first photodetector is configured to detect a portion of the first optical signal and the second photodetector is configured to detect a portion of the second optical signal;
wherein the beamsplitter is configured to reflect the portions of the first and second optical signals, wherein the portion of the first optical signal and the portion of the second optical signal is reflected from the beamsplitter to a respective one of the first and second photodetectors free from intervening optical components; and
one or more processors coupled to the first and second photodetectors, wherein the one or more processors are configured to reduce power disparities in the resonator coil between the first and second optical signals by:
determining a first power value corresponding to a total power of the first optical signal in the resonator coil from the first photodetector and a second power value corresponding to a total power of the second optical signal in the resonator coil from the second photodetector,
determining a differential power value from the first and second power values; and
adjusting at least one of: the first power value and the second power value based on the differential power value.

2. The system of claim 1, further comprising Pound-Drever-Hall circuitry coupled to the optical assembly and one of the first and second resonator loop closure optics, wherein the Pound-Drever-Hall circuitry is configured to receive a second portion of one of the first optical and the second optical signal, wherein the Pound-Drever-Hall circuitry is configured to lock a resonance frequency of the system based on which of the first or second optical signal sources is designated a master optical signal source.

3. The system of claim 1, further comprising one or more variable optical attenuators coupled to the one or more processors, wherein the one or more variable optical attenuators are configured to attenuate power of at least one of the first optical signal and the second optical signal based on a command signal received from the one or more processors.

4. The system of claim 1, wherein the optical assembly further comprises first and second coupling optics respectively coupled between the first and second resonator loop closure optics and respectively coupled to one of the first optical signal source and the second optical signal source, and
wherein the first coupling optics is configured to:
receive the first optical signal from the first optical signal source,
receive a third portion of the second optical signal;
transmit the first optical signal to the first resonator loop closure optics, and
transmit the third portion of the second optical signal to a first resonance tracking servo system; and
wherein the second coupling optics is configured to:
receive the second optical signal from the second optical signal source,
receive a third portion of the first optical signal,
transmit the second optical signal to the second resonator loop closure optics; and
transmit the third portion of the first optical signal to a second resonance tracking servo system.

5. The system of claim 4, wherein at least one of the first resonator loop closure optics, second resonator loop closure optics, first coupling optics, and second coupling optics comprise one or more fiber couplers.

6. The system of claim 4, wherein at least one of the first resonator loop closure optics, second resonator loop closure optics, first coupling optics, and second coupling optics comprise free-space optical components.

7. An optical assembly positioned in a gyroscope, comprising:
a first input, wherein the first input is configured to receive a first optical signal from a resonator coil;
a second input, wherein the second input is configured to receive a second optical signal from the resonator coil; and
signal extraction optics, wherein the signal extraction optics are configured to extract a portion of the first and second optical signals in free space;
wherein the signal extraction optics comprises a beamsplitter, wherein the beamsplitter is optically coupled to the first and second inputs, wherein the beamsplitter is configured to receive the first and second optical signals,
wherein the optical assembly is coupled to a first and second photodetector, wherein the first photodetector is configured to detect a portion of the first optical signal and the second photodetector is configured to detect a portion of the second optical signal,
wherein the beamsplitter is configured to reflect the portions of the first and second optical signals, wherein the portion of the first optical signal and the portion of the second optical signal is reflected from the beamsplitter to a respective one of the first and second photodetectors free from intervening optical components; and
wherein the portions of first and second optical signals are configured to provide a measure of a total power in the resonator coil, and represent a differential of the total power in the resonator coil.

8. The optical assembly of claim 7, wherein the gyroscope is a resonator fiber optic gyroscope (RFOG).

9. The optical assembly of claim 7, wherein the optical assembly is coupled to one or more processors, wherein the one or more processors are configured to:
determine a first power value corresponding to the first optical signal from the first photodetector and a second power value corresponding to the second optical signal from the second photodetector; and
adjust at least one of: the first power value and the second power value in response to a difference in power.

10. The optical assembly of claim 7, wherein the signal extraction optics includes a first lens optically coupled to the beamsplitter, and a second lens optically coupled to the beamsplitter.

11. The optical assembly of claim 7, wherein the beamsplitter is configured to reflect both the first and second optical signals from a common surface point on the beamsplitter.

12. The optical assembly of claim 7, wherein the optical assembly further comprises first and second resonator loop closure optics, wherein the first resonator loop closure optics is coupled to the first input and the second resonator loop closure optics is coupled to the second input, wherein the first and second resonator loop closure optics comprise at least one of a fiber coupler, beamsplitter, and circulator, and wherein the first and second resonator loop closure optics are configured to couple the first and second optical signals to the resonator coil.

13. The optical assembly of claim 12, wherein at least one of the first resonator loop closure optics and second resonator loop closure optics comprise free-space optical components.

14. The optical assembly of claim 7, wherein the optical assembly comprises a Silicon optical bench.

15. A method, comprising:
receiving, from a resonator coil, a first optical signal from a first portion of an optical assembly in a first direction, wherein the optical assembly comprises signal extraction optics in free space;
receiving, from the resonator coil, a second optical signal from a second portion of the optical assembly in a second direction;
reflecting a portion of the received first and second optical signals, wherein the portion of the received first optical signal and the portion of the received second optical signal are reflected out from the signal extraction optics in free space free from intervening optical components;
detecting the reflected portions of the first and second optical signals;
reducing power disparities in the resonator coil between the first and second optical signals by: determining a first power value corresponding to a total power of the first optical signal in the resonator coil and a second power value corresponding to a total power of the second optical signal in the resonator coil from the detected portions of the first and second optical signals;
determining a differential power value from the first and second power values; and
adjusting at least one of: the first power value and the second power value based on the differential power value.

16. The method of claim 15, wherein the signal extraction optics comprises a beamsplitter, and wherein reflecting at least a portion of the received first and second optical signals further comprises reflecting at least a portion of both the received first and second optical signals via the beamsplitter from a common surface point on the beamsplitter.

17. The method of claim 15, wherein detecting the reflected portions of the first and second optical signals further comprises detecting the reflected portion of the first optical signal via a first photodetector and detecting the reflected portion of the second optical signal via a second photodetector, and wherein the portions of the first and second optical are reflected to a respective one of the first and second photodetector free from intervening optical components.

18. The method of claim 15, further comprising polarizing the first and second optical signals before reflecting at least a portion of the first and second optical signals.

19. The method of claim 15, wherein reflecting at least a portion of the received first and second optical signals comprises reflecting a respective received portion that has a power between 0.5-1% inclusive of a total power of the first and second optical signals, respectively.

20. The method of claim 15, further comprising transmitting the first and second optical signals through a first and second lens, respectively, before the portions of the first and second optical signals are reflected.

* * * * *